(12) United States Patent
Severinsson et al.

(10) Patent No.: US 6,889,801 B2
(45) Date of Patent: May 10, 2005

(54) TRANSMISSION BRAKE

(75) Inventors: Lars Severinsson, Hishult (SE); Hakan P. O. Larsson, Billeberga (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/600,722

(22) Filed: Jun. 20, 2003

(65) Prior Publication Data

US 2004/0055837 A1 Mar. 25, 2004

Related U.S. Application Data

(63) Continuation of application No. PCT/SE01/02809, filed on Dec. 18, 2001.

(30) Foreign Application Priority Data

Dec. 20, 2000 (SE) ................................................ 0004715

(51) Int. Cl.[7] ............................................... B60T 13/04
(52) U.S. Cl. ...................................................... 188/171
(58) Field of Search ............................... 188/171, 82.9, 188/161, 129, 130; 192/90, 89.21, 223.2, 223.3

(56) References Cited

U.S. PATENT DOCUMENTS 2,693,254 A * 11/1954 Barish ......................... 188/171
3,068,975 A * 12/1962 Theuer ......................... 188/171

FOREIGN PATENT DOCUMENTS

DE    196 25 355 A1    1/1998
GB    1419236    3/1974

* cited by examiner

Primary Examiner—Thomas Williams
(74) Attorney, Agent, or Firm—St. Onge Steward Johnston & Reens LLC

(57) ABSTRACT

A transmission brake is arranged in connection with an electric motor for an electric brake. The transmission brake shall allow rotation of the motor shaft in a brake applying direction, but when motor current is no longer supplied, the shaft shall be locked. Rotation of the shaft in the brake release direction pre-supposes reverse rotation of the motor. A clutch is arranged between the shaft and a non-rotational housing. For accomplishing an engagement of the clutch at a rotation of the shaft but not the motor in the brake release direction there is a ramp.

7 Claims, 6 Drawing Sheets

TRANSMISSION BRAKE

This application is a continuation of pending International Patent Application No. PCT/SE01/02809 filed Dec. 18, 2001, which designates the United States and claims priority of pending Swedish Application No. 0004715-9 Dec. 20, 2000.

FIELD OF THE INVENTION

The present invention relates to a transmission brake for a rotational member driven by a motor means in a drive direction, the transmission brake allowing rotation of the rotational member in the opposite direction only to the extent that the motor means rotates in this opposite direction.

BACKGROUND OF THE INVENTION

The motor means may typically be an electric motor, whereas the rotational member may be its outgoing shaft. When the motor is driven in the drive direction, its rotation shall be transmitted to the shaft. When the motor is deenergized, a rotation in the opposite direction of the shaft shall be prevented, i.e. the shaft shall be locked in that direction. Only when the motor is driven in the opposite direction, the shaft shall rotate in that direction.

SUMMARY OF THE INVENTION

A transmission brake for accomplishing the above function is according to the invention characterized by clutch means between the rotational member and a non-rotational housing and ramp means for accomplishing an engagement of the clutch means at a rotation of the rotational member but not the motor means in said opposite direction.

A typical use of this transmission brake is in an electric brake, primarily for heavy road vehicles, such as buses, trucks and trailers, but also for rail vehicles. The development at the present time is towards less use of compressed air and more use of electric power in heavy road vehicles as well as in rail vehicles. It is thus quite natural that the possibility to use electric power for braking is being discussed.

In an electric brake an electric motor is usually used as its brake driving or applying means. When driven in one direction—the drive direction—the motor applies the brake. The brake may normally be a disc brake or a block brake. In the case of a disc brake, a brake lining is brakingly applied against a brake disc. The brake has accordingly to be provided with means for transforming the rotational movement of the motor into a linear movement of the brake lining.

The electric motor is thus driven in the drive direction for brake application and in the opposite direction for brake release. When the brake has been applied to the desired extent, no more current is normally supplied to the motor, but the brake shall remain applied, until the motor is driven in the opposite direction for brake release.

The purpose of the transmission brake or coupling is to accomplish this function. Rotation of the motor in the release direction shall unlock the transmission brake or coupling and allow a rotation of the motor shaft.

BRIEF DESCRIPTION OF THE DRAWINGS

The invention will be described in further detail below reference being made to the accompanying drawings, in which.

DETAILED DESCRIPTION OF THE DRAWINGS

Figure 1:
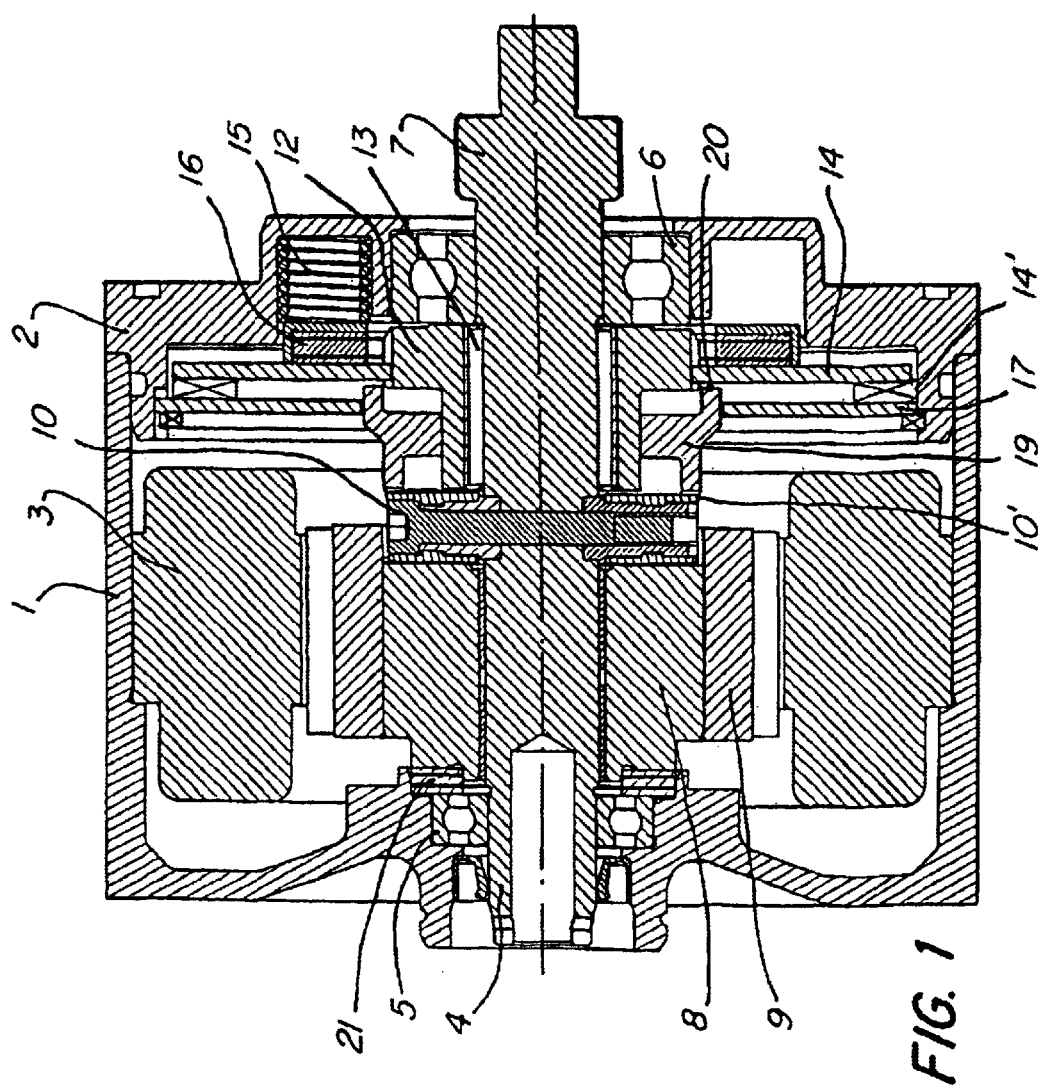
FIG. 1 is a section through an electric motor with a first embodiment of a transmission brake according to the invention.

A first embodiment according to FIGS. 1–5

In a motor housing 1 with a cover 2 a stator 3 is attached. A shaft 4 is journalled in the housing 1 by a first bearing 5 and in the cover 2 by a second bearing 6. The shaft 4 is provided with a gear 7 at its end extending out of the housing 1. This gear 7 is intended for connection to further parts of an electric disc brake arrangement, which are not further described.

The shaft 4 is provided with a ramp ring 8, which is journalled on the shaft and is to be further described, and coaxially outside thereof a rotor 9. At the supply of electric power the stator 3 and the rotor 9 will cooperate to form an electric motor rotationally driving the shaft 4, either in a direction for brake application or the opposite direction for brake release.

A driver pin 10 extends through the shaft 4. This pin 10 is in practice constructed of several parts but is regarded as one unit. The pin is, however, provided with elastic sleeves 10' at both ends. As is most clearly shown in FIG. 4, the ramp ring 8 is provided with recesses for the pin 10 and is rotatably arranged on the shaft 4, which means that there is a certain rotational play 11 between the shaft 4 and the ramp ring 8.

A splines ring 12 is arranged on the shaft 4 over a one-way coupling 13. A brake disc 14 is in splines engagement with the splines ring 12 and is provided with friction material 14'. It is biassed by compression springs 15 in the cover 12 via spring bearings 16 against a lamella 17, which is rotationally locked to the cover 2. The compression springs 15 may have the form of belleville washers.

Figure 2:
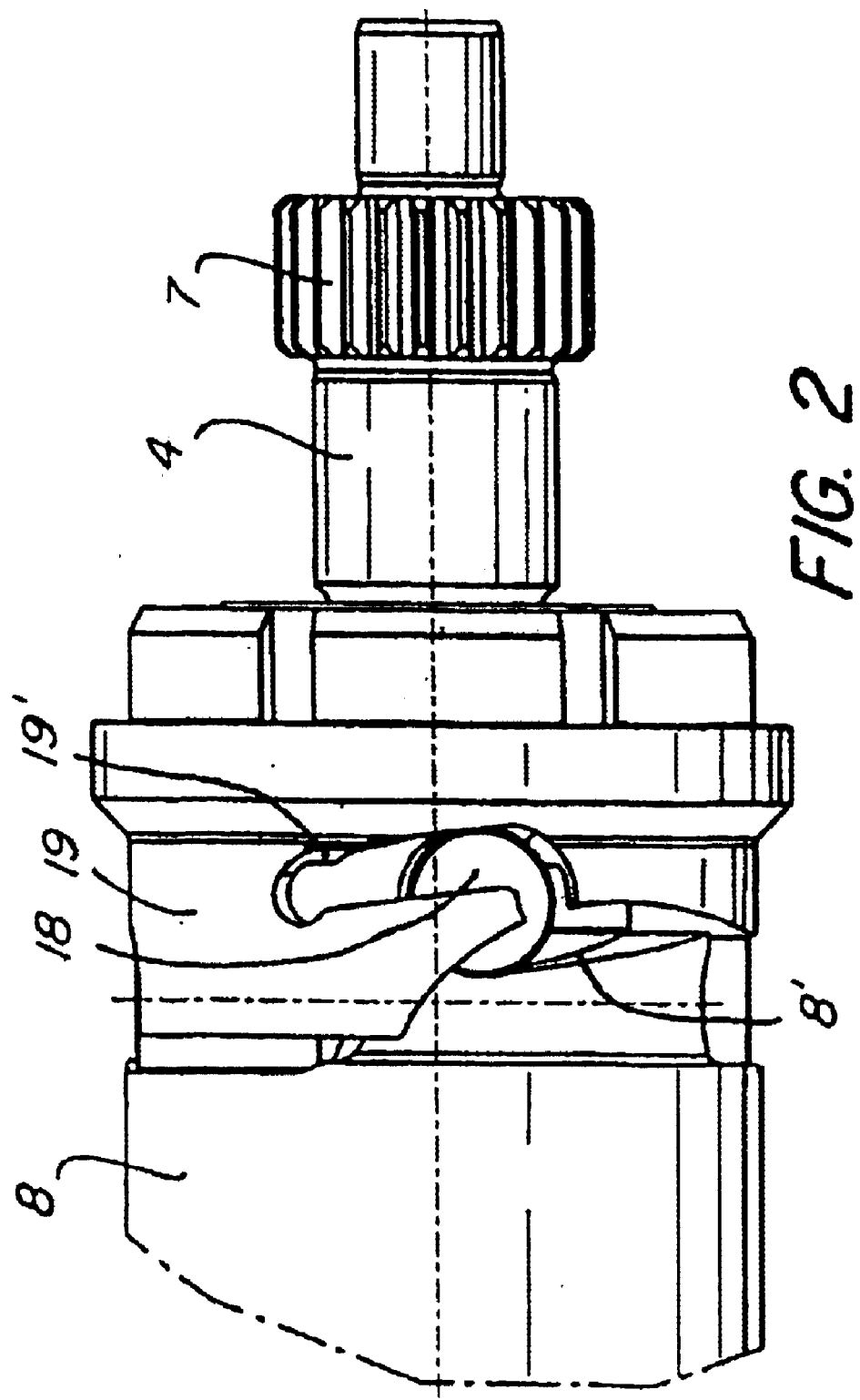
FIG. 2 is a side view of the major part of the transmission brake.
Figure 4:
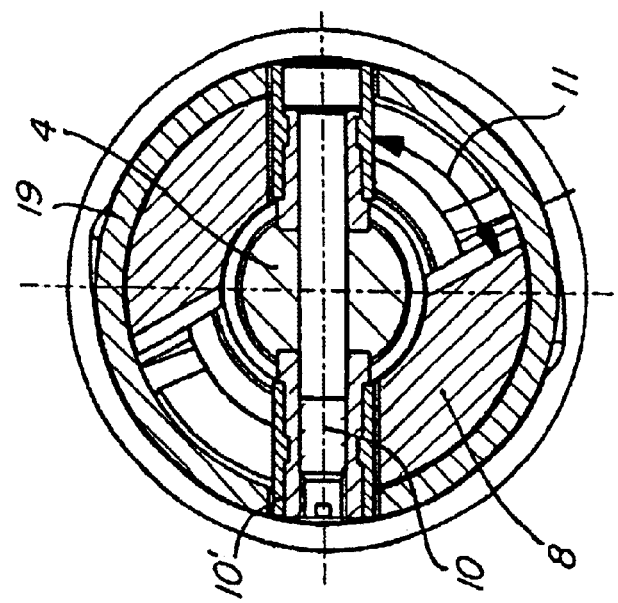
FIG. 4 is a section through the transmission brake along the line IV—IV in FIG. 3.
Figure 3:
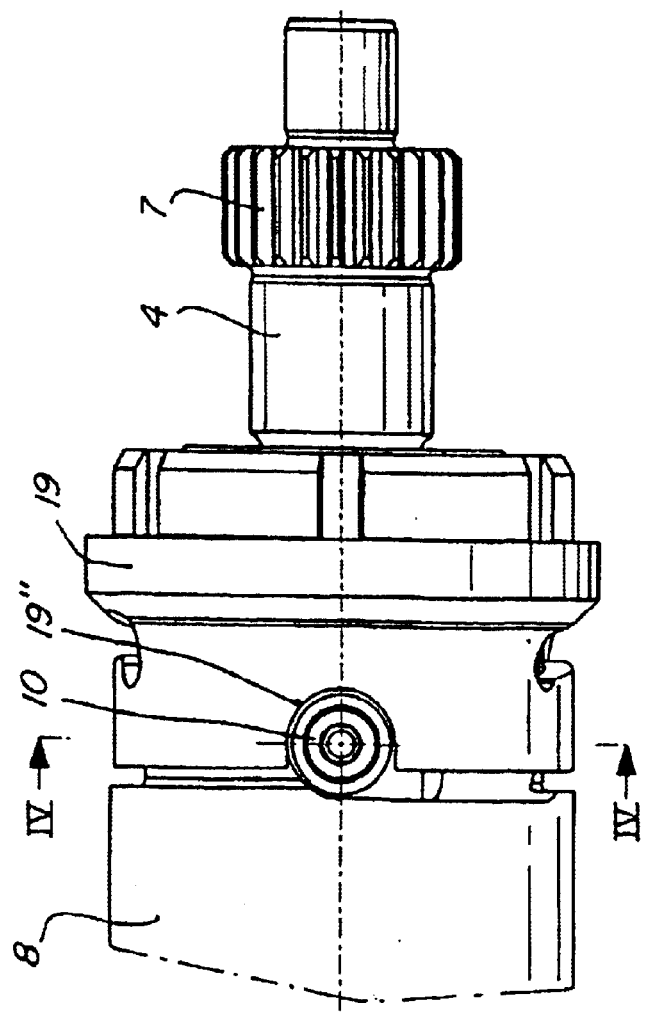
FIG. 3 is another side view—90° turned in relation to FIG. 2 of the transmission brake.
Figure 5:
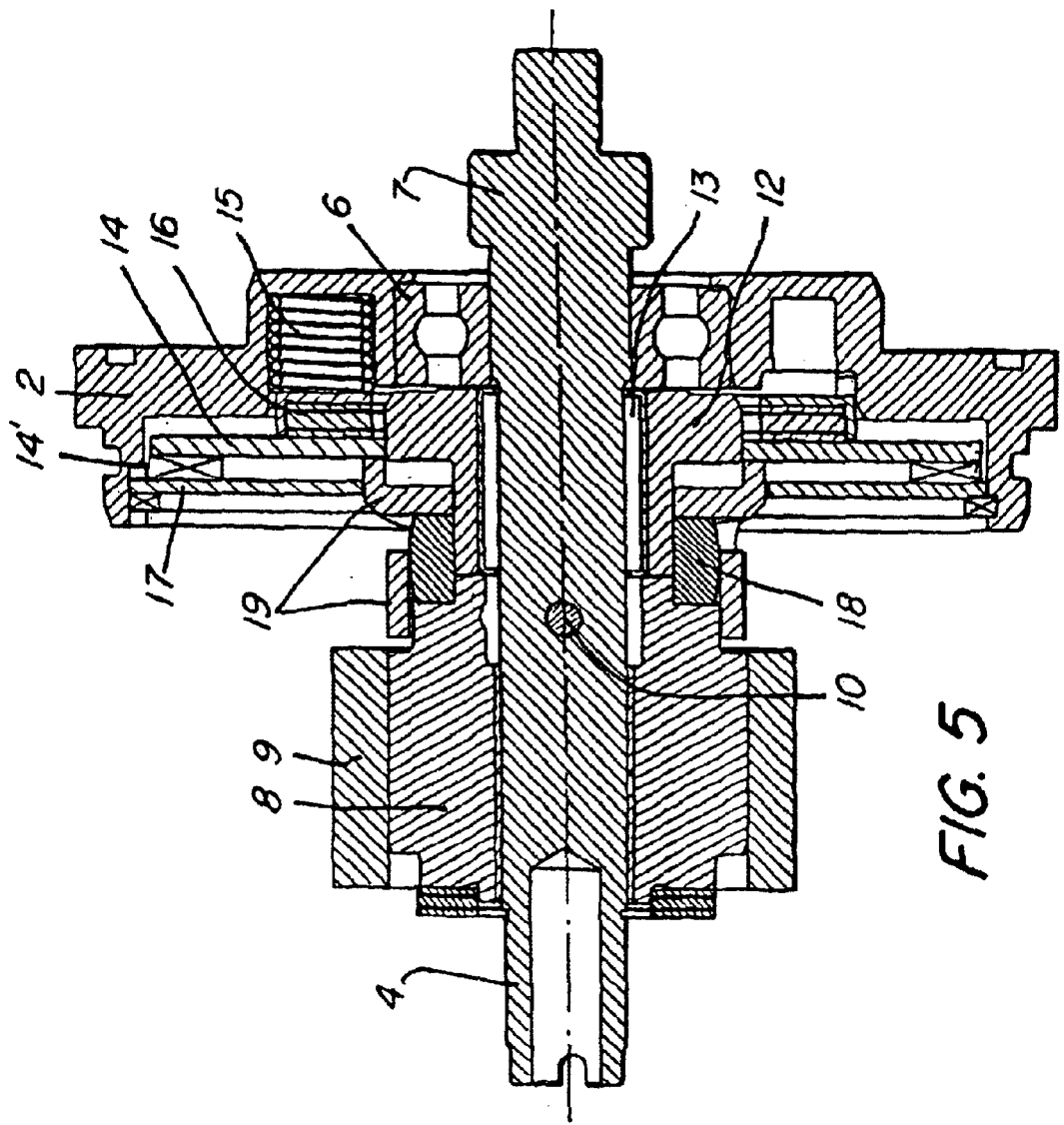
FIG. 5 is a section substantially corresponding to FIG. 1 but 90° turned and with certain parts of the electric motor omitted.

Rollers 18 (FIGS. 2 and 5) are arranged between the ramp ring 8 and a ramp sleeve 19 and are acting between corresponding ramp surfaces 8' and 19' on these parts, as is indicated in FIG. 2. The ramp sleeve 19 is rotationally locked in relation to the shaft 4 by recesses 19" for the driver pin 10 (FIG. 3).

When the ramp ring 8 is turned in relation to the shaft 4, the rollers 18 roll up the ramp surfaces 8' and 19', so that a play 20 between the brake disc 14 and the ramp sleeve 19 is consumed and the springs 15 are compressed, which means that the friction between the friction material 14' and the lamella 17 disappears. The reaction force is hereby taken up by an axial bearing 21.

Function

When the electric motor rotates in the direction for brake application, the ramp ring 8 carries the shaft 4 with it. The shaft 4 rotates in the non-locking direction of the one-way coupling 13.

When the electric motor is stopped, so that the torque on the ramp ring 8 disappears and the shaft 4 has a tendency to rotate in the opposite direction or brake release direction, this rotation is blocked by the one-way coupling 13 and the brake disc 14.

When the electric motor is rotated in the opposite direction for brake release, the ramp ring 8 will move rotationally in the play 11, so that the rollers 18 roll up the ramp surfaces 8' and 19' and the friction between the friction material 14' on the brake disc 14 and the lamella 17 ceases. Finally, the brake disc 14 and thus the shaft 14 will be allowed to rotate in the brake release direction.

Figure 6:
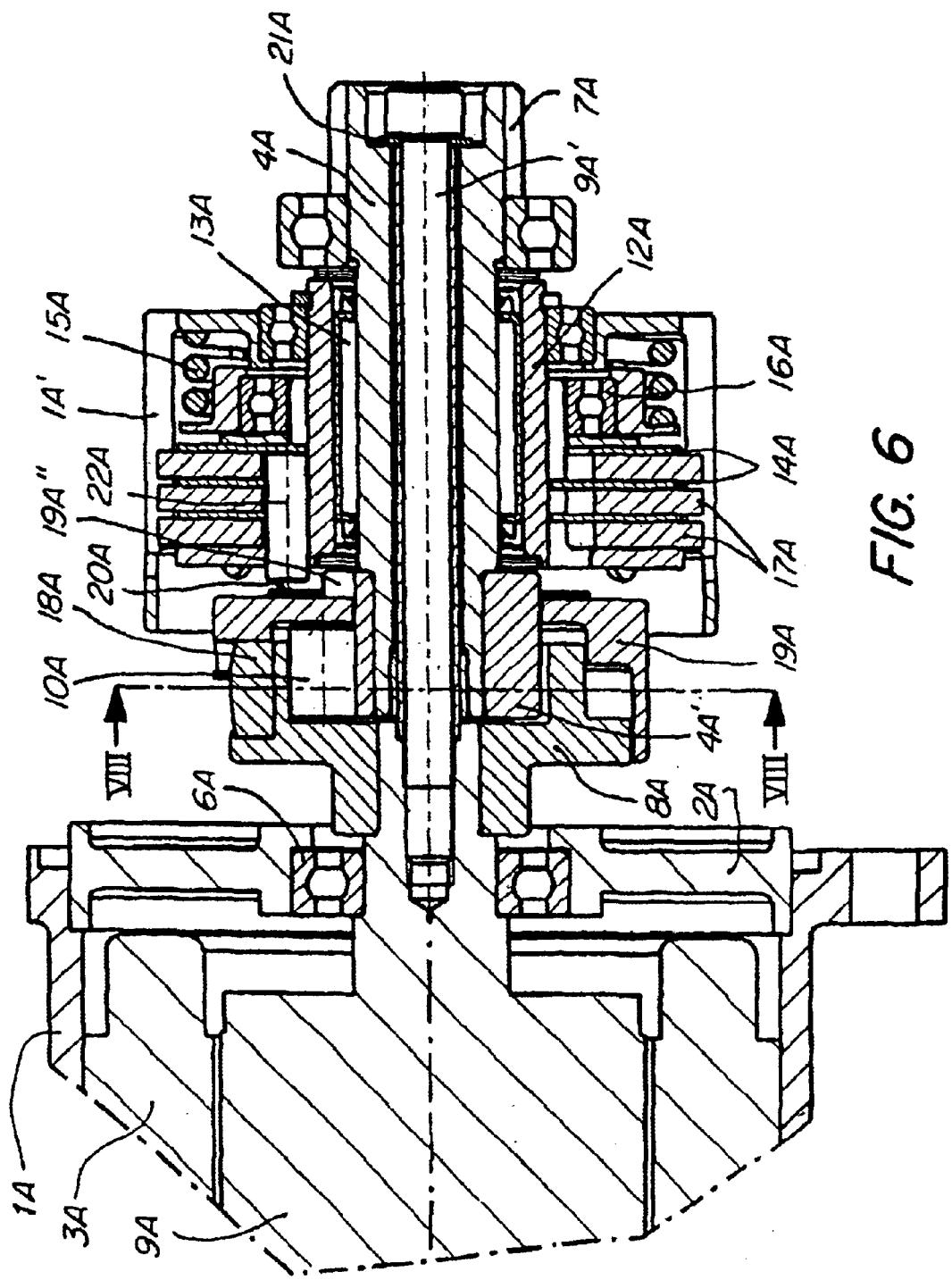
FIG. 6 is section through an electric motor with a second embodiment of a transmission brake according to the invention.
Figure 8:
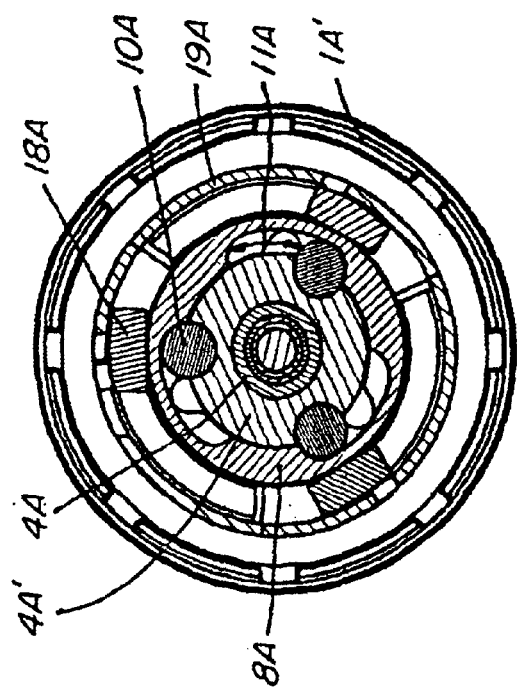
FIG. 8 is a sectional view along the line VIII—VIII in FIG. 6.
Figure 7:
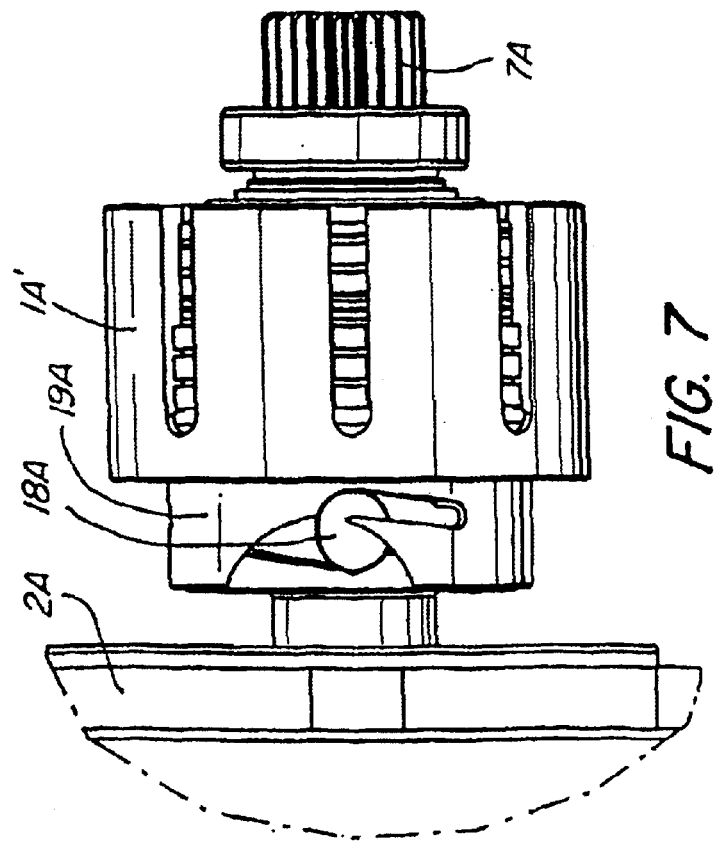
FIG. 7 is a side view generally corresponding to FIG. 6 but to a smaller scale.

A Second Embodiment According to FIGS. 6–8

The second embodiment has many similarities with the first embodiment, although in this case the transmission brake is not built into the electric motor. Accordingly the same reference numerals—with the addition of an "A"—are used for corresponding parts.

We thus recognize the housing 1A, the cover 2A, the stator 3A, the cover bearing 6A, and the rotor 9A. The shaft 4A is rotationally movably attached to the rotor 9A by means of a screw 9A' and has a gear 7A.

The ramp ring 8A is arranged on the rotor 9A, whereas the shaft 4A is provided with a shaft hub 4A'. Cylindrical driver elements 10A are—as shown in FIG. 8—arranged in the shaft hub 4A' and extended into recesses in the ramp ring 8A, so that there is a certain rotational play 11A between the shaft 4A (or rather its hub 4A') and the ramp ring 8A. The driver elements 10A are elastic.

As has been stated, this second transmission brake is arranged outside the electric motor and accordingly has to have its own housing 1A', which is held stationary in a way not shown.

The following parts in the housing 1A' can be recognized, although differently designed: the splines ring 12A, the one-way coupling 13A, the brake discs 14A connected to the splines rings 12A, the compression spring 15A, the bearing 16A, the lamellas 17A connected to the housing 1A', the rollers 18A, the ramp sleeve 19A being rotationally locked to the shaft hub 4A' at 19A", the axial play 20A formed between the ramp sleeve 19A and push pins 22A extending through the brake discs 14A (except the one furthest to the right in FIG. 6), and the axial bearing 21A.

The function of the second embodiment now described corresponds to that of the first embodiment.

What is claimed is:

1. A transmission brake for a rotational member comprising:
    a motor for driving the rotational member in a drive direction, the transmission brake allowing rotation of the rotational member in an opposite direction only to the extent that the motor is driven in this opposite direction,
    a clutch positioned between the rotational member and a non-rotational housing, and
    a ramp for disengaging the clutch when the rotational member is rotated in the drive direction but not the motor in a direction opposite to the drive direction;
        wherein rollers are arranged between inclined ramp surfaces on a ramp ring, connection to a rotor of the motor, and a ramp sleeve for disengaging the clutch against the spring bias and there is a rotational play between the ramp ring and the rotational member; and
        wherein a driver pin extending through the shaft is in engagement with recesses in a radial end surface of the ramp ring, which is rotationally arranged on the rotational member.

2. A transmission brake according to claim 1, wherein the clutch is spring-biased into engagement.

3. A transmission brake according to claim 1, wherein the clutch comprises at least one brake disc, connected to the rotational member and at least one lamella connected to the housing.

4. A transmission brake according to claim 3, wherein the at least one brake disc is in splines engagement with a splines ring connected to the shaft via a one-way coupling.

5. A transmission brake for a rotational member comprising:
    a motor for driving the rotational member in a drive direction, the transmission brake allowing rotation of the rotational member in an opposite direction only to the extent that the motor is driven in this opposite direction,
    a clutch positioned between the rotational member and a non-rotational housing, and
    a ramp for disengaging the clutch when the rotational member is rotated in the drive direction but not the motor in a direction opposite to the drive direction,
        wherein rollers are arranged between inclined ramp surfaces on a ramp ring, connected to a rotor of the motor, and a ramp sleeve for disengaging the clutch against the spring bias and there is a rotational play between the ramp ring and the rotational member; and
        wherein driver elements radially protruding from a rotational member hub are in engagement with circumferential recesses in the ramp ring, the rotational member with the rotational member hub being rotationally arranged in relation to the rotor and the ramp ring being connected to the rotor.

6. A transmission brake having a housing comprising:
    a shaft coupled to and for engaging a brake;
    a motor having a rotor coupled to and for driving said shaft;
    a clutch positioned between said shaft and the housing;
    a ramp ring connected to the shaft for disengaging said clutch when the shaft is rotated in a drive direction, said ramp ring having inclined ramp surfaces;
    a ramp sleeve communicating with said ramp ring for disengaging said clutch against a spring bias; and
    a driver pin extending through said shaft engaging with recesses in a radial end surface of said ramp ring;
        wherein said clutch allows rotation of said shaft in the drive direction and said clutch allows rotation of said shaft in a direction opposite to the drive direction only to the extent that the motor is driven in this opposite direction.

7. A transmission brake having a housing comprising:
    a shaft coupled to and for engaging a brake;
    a motor having a rotor coupled to and for driving said shaft;
    a clutch positioned between said shaft and the housing;
    a ramp ring connected to the shaft for disengaging said clutch when the shaft is rotated in a drive direction, said ramp ring having inclined ramp surfaces;
    a ramp sleeve communicating with said ramp ring for disengaging said clutch against a spring bias; and
    at least one driver element radially protruding from a shaft hub in engagement with circumferential recesses in said ramp ring, the shaft with the rotational member hub being rotationally arranged in relation to the rotor and the ramp ring being connected to the rotor;
        wherein said clutch allows rotation of said shaft in the drive direction and said clutch allows rotation of said shaft in a direction opposite to the drive direction only to the extent that the motor is driven in this opposite direction.

* * * * *